United States Patent [19]

Morino et al.

[11] 4,240,732
[45] Dec. 23, 1980

[54] FLASH SYSTEM CHANGEOVER DEVICE FOR THE SHUTTER OF CAMERA

[75] Inventors: Yukio Morino; Shogo Kato; Masanori Watanabe, all of Shikawatshi, Japan

[73] Assignee: Seiko Koki Kabushiki Kaisha, Tokyo, Japan

[21] Appl. No.: 18,912

[22] Filed: Mar. 9, 1979

[30] Foreign Application Priority Data

Mar. 10, 1978 [JP] Japan ................. 53/281307

[51] Int. Cl.³ ............................................. G03B 15/03
[52] U.S. Cl. .................................. 354/138; 354/141; 354/147
[58] Field of Search ............... 354/138, 137, 140, 141, 354/147, 34

[56] References Cited

U.S. PATENT DOCUMENTS 2,502,668 4/1950 Pirwitz ................................. 354/137
2,514,919 7/1950 Willcox ................................. 354/138

Primary Examiner—J. V. Truhe
Assistant Examiner—Shelley Wade
Attorney, Agent, or Firm—Robert E. Burns; Emmanuel J. Lobato; Bruce L. Adams

[57] ABSTRACT

A flash changeover device for a shutter is operative when the exposure operation is performed by cancelling the retention on a shutter blade control in the charged state by the operation of an actuating member which has previously been charged and is actuated by a shutter release operation. The device includes a flash system changeover member, a switching member, a synchronizing switch and wherein the switching member is oscillatably mounted on the changeover member so as to close the synchronizing switch in connection with the operation of the actuating member when the flash system changeover member is set to a first position and to close the synchronizing switch in connection with the shutter blade opening operation of the shutter blade control member when the flash system changeover member is set at a second position. The synchronizing switch has contacts having relative positions which are independent of the position of the changeover member when the synchronizing switch is in the open state.

5 Claims, 12 Drawing Figures 4,240,732

FLASH SYSTEM CHANGEOVER DEVICE FOR THE SHUTTER OF CAMERA

BACKGROUND OF THE INVENTION

This invention relates to a flash device for the shutter of a camera and more particularly to a flash system changeover device for a shutter having a plural flash system, such as an M-contact and an X-contact.

DESCRIPTION OF THE PRIOR ART

In the conventional camera having a plural flash system, such as an M-contact and an X-contact, it has been a usual procedure to provide two independent flash mechanisms, the M-contact mechanism actuated in connection with a member which operates prior to the exposure operation and the X-contact mechanism actuated in connection with the exposure operation, and a changeover mechanism for selecting between those flash mechanisms. Accordingly, the conventional flash device required more component parts and a complicated mechanism.

Furthermore, in the conventional flash system changeover device, when the X-contact is employed, only the X-contact mechanism operates and the M-contact mechanism remains idle, while when the M-contact is employed, the X-contact mechanism has to operate after the M-contact mechanism has operated so that special consideration had to be given to the X-contact mechanism to provide sufficient duarability as the X-contact mechanism has to operate at all times.

Still further, the conventional flash system changeover device has the disadvantage that actuation of the flash light device cannot be interrupted after the flash light device is charged with electricity except when the flash light device is disconnected from the synchronizing switch because the synchronizing switch is closed by operation of either one of or both of the contact mechanisms.

SUMMARY OF THE INVENTION

Accordingly, an object of the present invention is to provide a flash device which is simply constructed with less component parts and which has excellent duarability.

In order to attain the aforesaid object, the flash system changeover device according to the present invention is provided with a synchronizing lever oscillatably mounted on a flash system changeover member so as to be actuated in connection with the operation of a setting lever which operates prior to the exposure operation of the shutter to obtain the M-delay time when the changeover member is set at the M-contact position and also so as to be actuated in connection with the shutter blade opening operation of a shutter blade control member to obtain the X-delay time when the changeover member is set at the X-contact position. Thus, the changeover member and the synchronizing member mounted on the changeover member are commonly applied both to the M-contact system and the X-contact system, while the M-contact system and the X-contact system are operated separately.

Furthermore, the changeover member is possible to be set at the position intermediately between the M-contact position and the X-contact position where the synchronizing lever is disconnected from either the setting lever and the shutter blade control member to keep both the M-contact and the X-contact idle as described in claim 2.

BRIEF DESCRIPTION OF THE DRAWING

FIGS. 2 to 4, inclusive, are fragmentary views concerning the shutter blade control mechanism.

FIGS. 5 to 7, inclusive, are fragmentary views concerning the M-contact mechanism.

FIGS. 8 and 9 are fragmentary views concerning the X-contact mechanism.

FIG. 10 illustrates a state of the synchronizing mechanism when both the M-contact and the X-contact are idle.

DETAILED DESCRIPTION OF PREFERRED EMBODIMENTS

Figure 1:
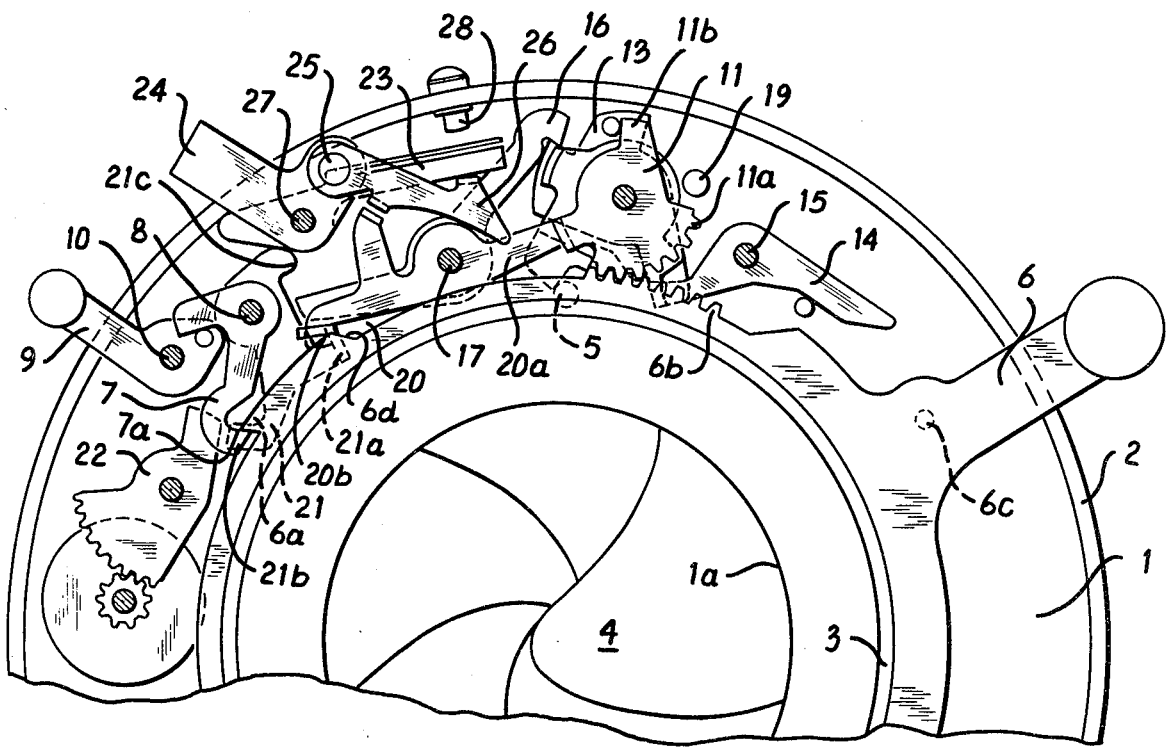
FIG. 1 is a general plan view of a shutter according to the present invention.

Referring to the drawings, particularly to FIG. 1, respective reference numerals indicate, (1): a base plate, (1a): an aperture provided on the base plate (1), (2): a frame, (3): a lense barrel, (4): shutter blades controlled by a shutter blade control ring, not shown, (5): a shutter blade actuating pin, (6): a setting lever which starts prior to the exposure operation and having a shoulder part (6a), gear teeth (6b) and a pin (6c), (7): a detent for restraining the setting lever, (8): a shaft for the detent (7), (9): a release lever rotatable on a shaft (10), (11): a setting gear having gear teeth (11a), a setting arm (11b) and a synchronizing lever actuating raised part (11c) (FIG. 5), (12): an opening lever having a finger (12a), an aperture limiting part (12b), an arm (12c), a projection (12d) and a raised part (12e) (FIG. 2), (13): a closing lever having a shoulder (13a), an aperture limiting part (13b), a pin (13c) and an arm (13d) (FIG. 2), (18): a common shaft for the setting gear (11), the opening lever (12) and the closing lever (13), (14): a detent for retaining the opening lever (12) having a finger (14a) and an arm (14b) (FIG. 2), (15): a shaft for the detent (14), (16): a detent for retaining the closing lever (13) having a claw (16a) and an arm (16b) and mounted on a shaft (17) (FIG. 2), (19): a stopper for limiting the rotation of the opening lever (11) and the closing lever (12), (20): a timing lever having an arm (20a), a claw (20b) and a raised part (20c) (FIG. 8), (21): a driving lever having a raised part (21a), and arms (21b) and (21c), (22): the first wheel of a known delaying device for controlling the exposure time, (23): a synchronizing contact having an arm (23a), a contact piece (23b) and an arm (23c) (FIG. 5), (24): a flash system changeover lever oscillatably provided on its arm (24a) with a synchronizing lever (26) having raised parts (26a) and (26b) and an arm (26c) (FIG. 5) and (28): a pin for receiving the synchronizing contact.

The manner of operation of the various parts described in connection with the drawings will be explained.

First the operation of the shutter blades of the shutter according to the present invention will be explained referring to FIGS. 1 to 4.

Figure 2:
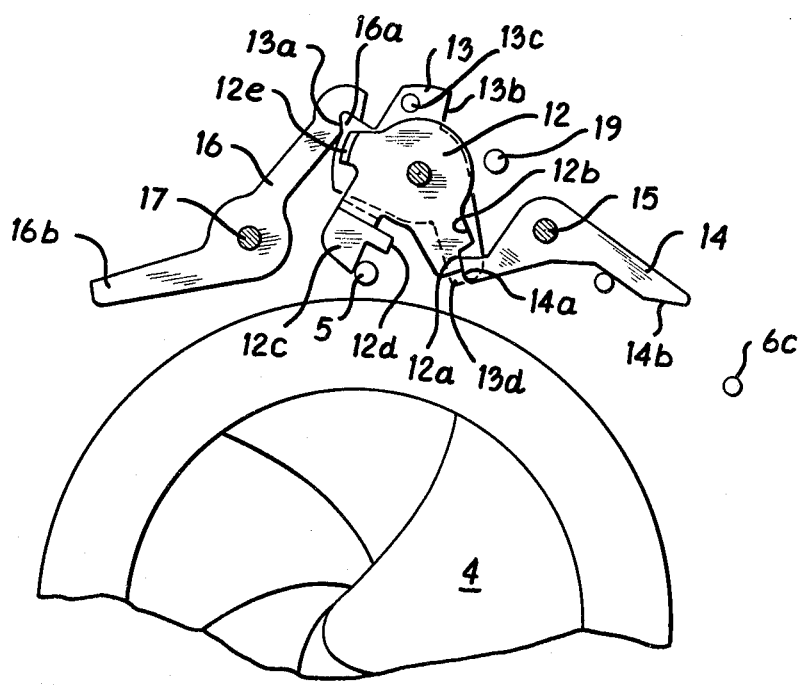
FIGS. 2 to 10, inclusive, are fragmentary plan views of FIG. 1.
Figure 3:
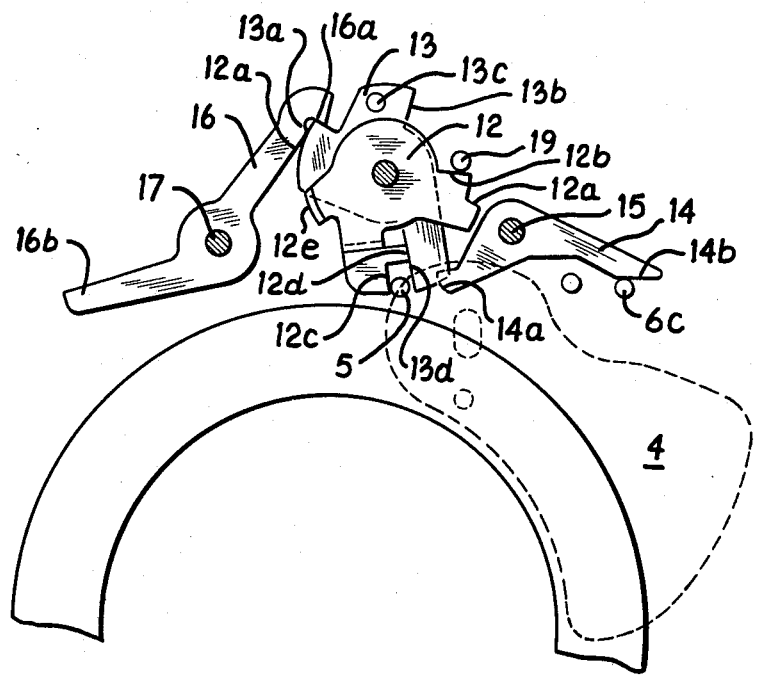
Figure 4:
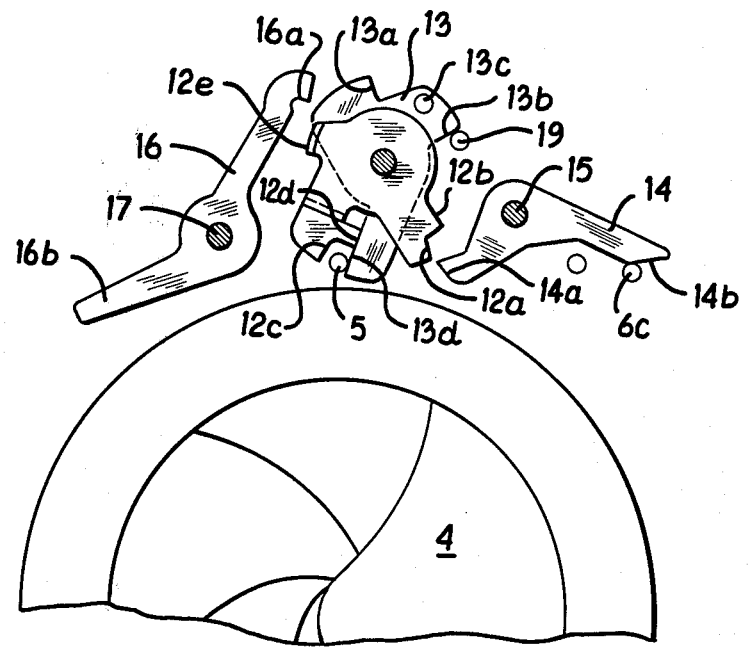

Starting from charged state as shown in FIG. 1, when the release lever (9) is turned counterclockwise about the shaft (10), the detent (7) interlocked with the release lever (9) is turned clockwise about the shaft (8) to cancel the engagement between the shoulder part (6a) and the claw (7a) so that the setting lever 6 is allowed to turn counterclockwise urged by a spring, not shown. A little before the completion of rotation of the setting lever (6), the pin (6c) pushes the detent (14) at the arm (14b) to turn the detent (14) about the shaft (15) counterclockwise so that the engagement between the fingers (14a) and (12a) are cancelled. Consequently, the opening lever (12) is allowed to be turned counterclockwise by a spring, not shown, until the aperture limiting part (12b) hits against the stopper (19). According to the rotation of the opening lever (12), the arm (12c) acts on the shutter blade actuating pin (5) of the shutter blade control ring, not shown, to turn the shutter blade control ring clockwise so that the shutter blades (4) are opened through a known method. During the rotation of the opening lever (12), the raised part (12e) engages with the arm (20a) of the timing lever (20) to turn the timing lever (20) clockwise about the shaft (17) so that the engagement between the claw (20b) and the raised part (21a) is cancelled and the driving lever (21) is allowed to be turned clockwise by a spring, not shown, about the shaft (8). The rotation of the driving lever 21 is delayed for a fixed time by a known method as the arm (21b) is connected with the first wheel (22) of the delaying device (partially shown). After the delayed rotation of the driving lever (21), the arm (21c) comes into engagement with the arm (16b) of the detent (16) to turn the detent (16) counterclockwise about the shaft (17) so that the engagement of the claw (16a) with the shoulder (13a) of the closing lever (13) is cancelled, therefore, the closing lever (13) is allowed to be turned clockwise by a spring, not shown. As the closing lever (13) is turned, the opening lever (12) is turned clockwise together with the closing lever (13) by the engagement of the arm (13d) with the projection (12d) of the opening lever (12). According to the clockwise rotation of the closing lever (13), the arm (13d) of the closing lever (13) acts on the shutter blade actuating pin (5) to turn the shutter blade control ring, not shown, counterclockwise so that the shutter blades (4) are closed. The closing lever (13) stops when the aperture limiting part (13b) comes to hit against the stopper (19) (FIG. 4). In re-charging the shutter starting from the state of completion of the exposure as shown in FIG. 4, the setting lever (6) is turned clockwise, then the setting gear (11) is turned counterclockwise as the gear teeth (11a) are engaged with the gear teeth (6b) so that the arm (11b) pushes the closing lever (13) at the pin (13c) to turn the closing lever (13) counterclockwise until the closing lever comes to be retained by the claw (16a) of the detent (16) at the shoulder (13a), thus the shutter is re-charged. At the same time, the opening lever (12) is retained by the detent (14) by the engagement of the finger (14a) with the finger (12a) of the opening lever (12) because the engagement between the pin (6c) of the setting lever (6) and the arm (14b) of the detent (14) is cancelled before the arm (11b) of the setting gear (11) comes into engagement with the pin (13c) of the closing lever (13) in the initial stage of the charging operation, therefore, the opening lever (12) is retained at the charged position as shown in FIG. 4 prior to the counterclockwise rotation of the closing lever (13), so that the opening spring (not shown), provided between the opening lever (12) and the closing lever (13), is strained according to the charging operation of the closing lever (13). The cam surface (6d) of the setting lever (6) pushes the raised part (21a) of the driving lever (21) to turn the driving lever (21) counterclockwise about the shaft (8) so that the raised part (21a) is retained by the claw (20b) of the timing lever (20). Thus the charging of the shutter is completed (FIGS. 1 and 2).

Figure 5:
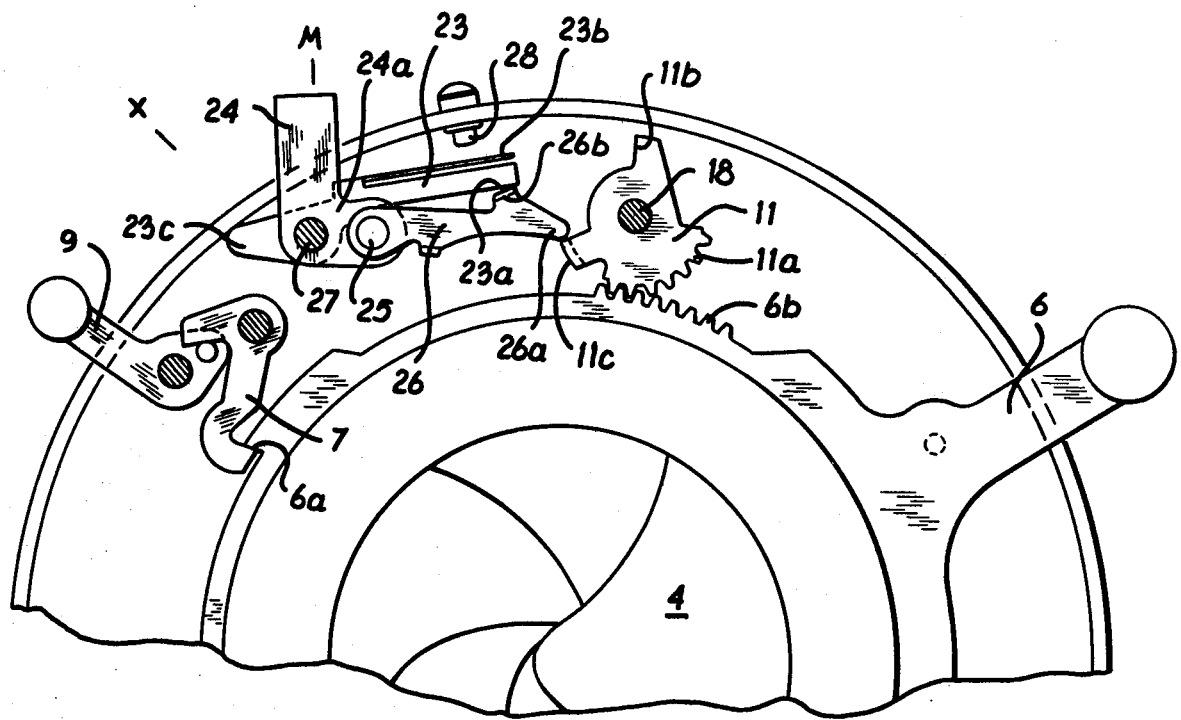
Figure 6:
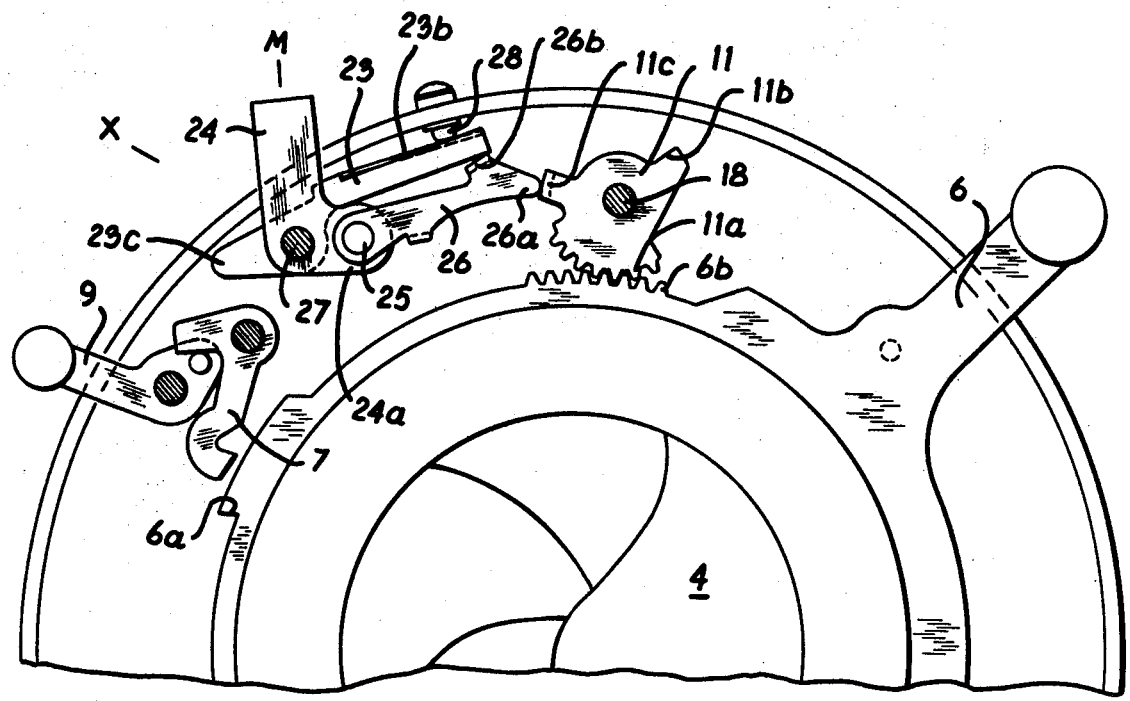
Figure 7:
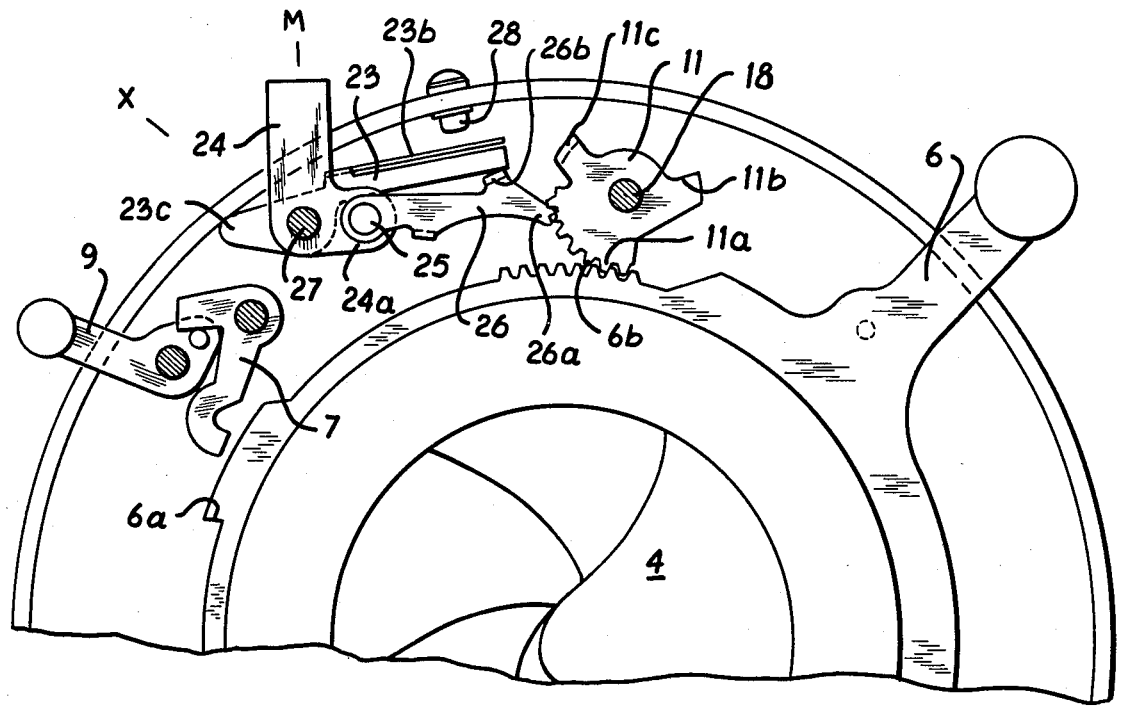

Referring now to FIGS. 5 to 7, an explanation will be given of the manner of operation of the M-contact mechanism. Starting from the charged state as shown in FIG. 5, when the shutter is released, the setting lever (6) starts turning counterclockwise turning the setting gear (11) clockwise about the shaft (18) by the engagement of the gear teeth (6b) and (11a). As the setting gear 11 is turned clockwise, the raised part (11c) of the setting gear (11) pushes the synchronizing lever (26) at the arm (26a) to turn the synchronizing lever (26) counterclockwise about the shaft (25), then the raised part (26b) pushes the synchronizing contact (23) at the arm (23a) to turn the synchronizing contact (23) counterclockwise about the shaft (27) against a spring, not shown, so that the contact piece (23b) comes to hit against the pin (28), then the synchronizing contact (23) is closed and the flash light device is actuated (FIG. 6). The setting gear (11) continues turning and finally the raised part (11c) escapes from the arm (26a) of the synchronizing lever (26), therefore, the synchronizing contact (23) is opened after a fixed time. A little before the end of turning, the setting lever (6) cancels the retention by the detent (14) on the shutter blade opening mechanism, as hereinbefore described, so that the exposure is started. In this manner, During the operation of the setting lever (6), the exposure operation is delayed for a fixed time after the closing of the synchronizing switch and the M-contact synchro-flash exposure is performed. In re-charging the synchronizing mechanism, as the setting lever (6) is turned clockwise, the setting gear (11) is turned counterclockwise while the raised part (11c) pushes the synchronizing lever (26) at the upper edge of the arm (26a) to turn the synchronizing lever (26) clockwise and after the raised part (11c) has slipped away from the arm (26a) and the relative position of the raised part (11c) and the arm (26a) has been interchanged, the synchronizing lever (26) is allowed to be turned counterclockwise by a spring, not shown, until the raised part (26b) is stopped by the arm (23a) of the synchronizing contact (23), thus the synchronizing mechanism is re-charged as shown in FIG. 5.

Figure 8:
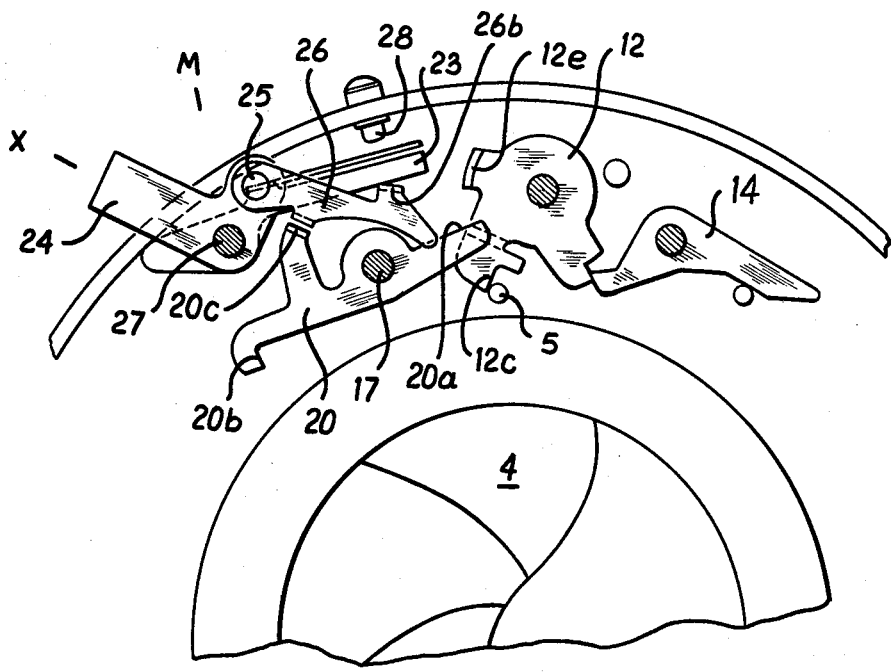
Figure 9:
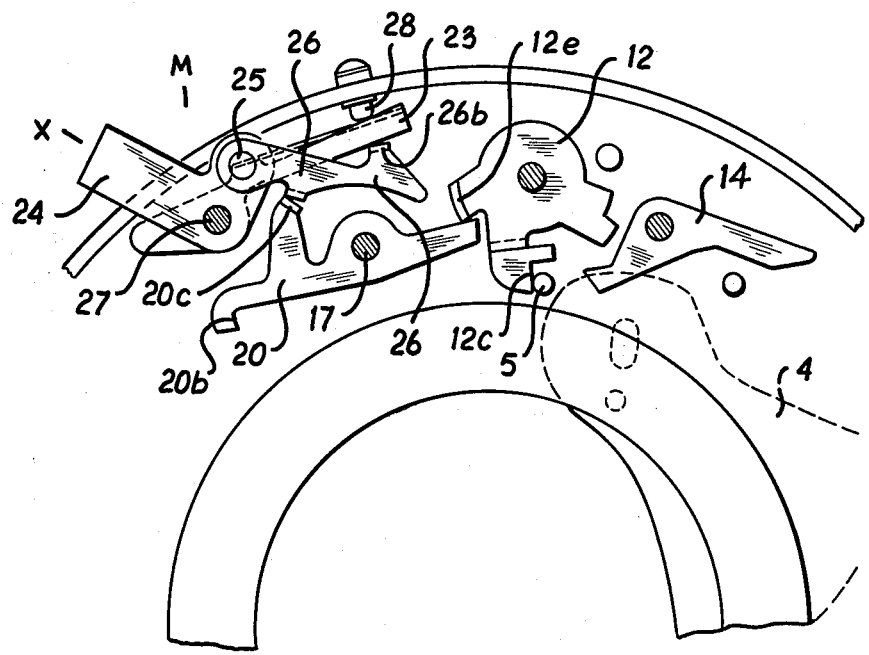

Referring to FIGS. 8 and 9, explanation will be made on the manner of operation of the X-contact mechanism. Starting from the charged state with the flash system changeover lever (24) set at the X-contact position as shown in FIG. 8, when the detent (14) is turned counterclockwise by the setting lever (6), the opening lever (12) is allowed to be turned counterclockwise and the arm (12c) pushes the shutter blade actuating pin (5) so that the shutter blades (4) start opening. And when the shutter blades are almost fully opened, the raised part (12e) comes into engagement with the arm (20a) of the timing lever (20) and turns the timing lever (20) clockwise about the shaft (17). Consequently, the raised part (20c) of the timing lever (20) pushes the synchronizing lever (26) at the raised part (26c) to turn the synchronizing lever (26) counterclockwise about the shaft (25) causing the synchronizing contact (23) to hit against the pin (28) and the synchronizing switch to be closed (FIG. 9). The opening lever (12) is allowed to return to its starting position according to the closing operation of the shutter blades so that the synchronizing switch is opened (FIG. 8). In this manner the synchronizing switch is kept closed only during the exposure.

Figure 10:
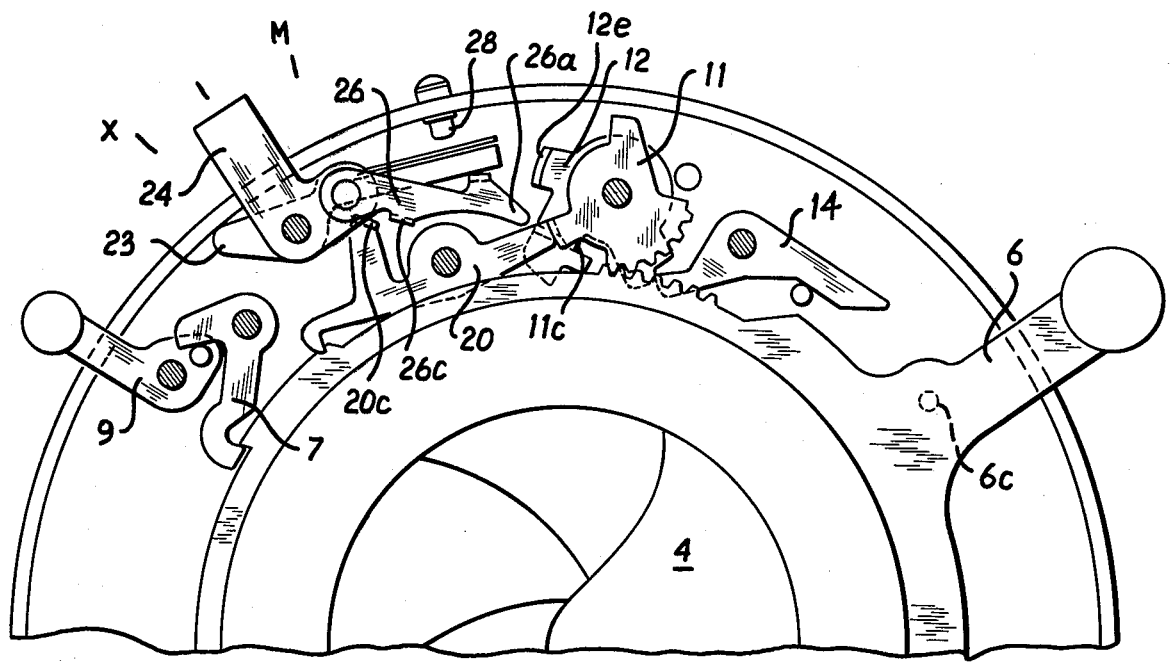

Referring to FIG. 10, explanation will be made on the manner of operation of a preferred embodiment wherein the flash system changeover lever 24 is capable of being set at a third position where the synchronizing lever 26 is engaged with neither the setting gear 11 or the timing lever 20. When the flash system changeover lever (24) is set at the intermediate position between the M-contact and the X-contact, neither the arm (26a) of the synchronizing lever (26) and the raised part (11c) of the setting gear (11) nor the the raised part (26c) of the synchronizing lever (26) and the raised part (20c) of the timing lever (20) are engaged, therefore, the synchronizing contact (23) will not come into contact with the pin (28).

Explanation will be made hereinafter of other embodiments according to the present invention referring to FIGS. 11 and 12, wherein like parts as shown in FIGS. 1 to 10 will be indicated by like reference numerals.

Figure 11:
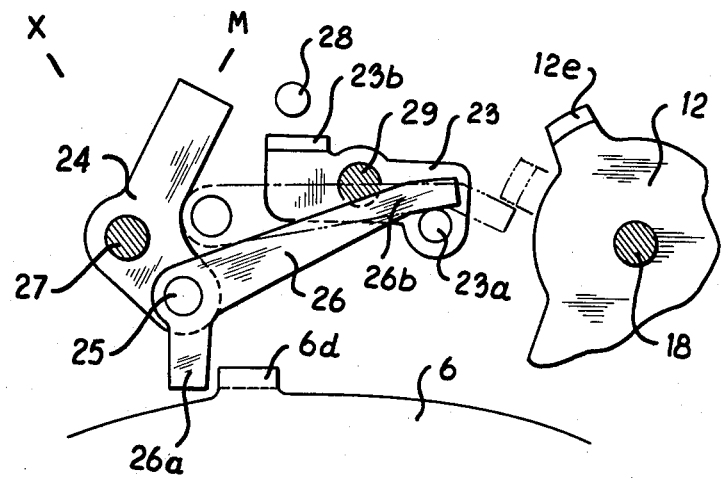
FIGS. 11 and 12 are fragmentary plan views of other embodiments according to the present invention.

Referring to FIG. 11, the continuous lines and the dashed lines illustrate the position of the synchronizing lever (26) in the M-contact setting and the X-contact setting, respectively. When the synchronizing lever (26) is set at the M-contact position and the shutter is released, the setting lever (6) starts turning counterclockwise and the raised part (6d) pushes the arm (26a) of the synchronizing lever (26) which is oscillatably provided on the flash system changeover lever (24) by the shaft (25) so that the synchronizing lever (26) is turned clockwise about the shaft (25). Consequently, the arm (26b) of the synchronizing lever (26) pushes the synchronizing contact (23) at the pin (23a) to turn the synchronizing contact (23) clockwise about the shaft (29) so that the raised part (23b) comes in contact with the pin (28). The raise part (6d) of the setting lever passes over the arm (26a) of the synchronizing lever (26) after having pushed the arm (26a) for a fixed angle, therefore, the contact between the synchronizing contact (23) and the pin (28) is maintained for a fixed time and then broken.

In charging the mechanism, the raised part (6d) of the setting lever pushes the synchronizing lever (26) at the left edge of the arm (26a) causing the synchronizing lever (26) to turn counterclockwise for a certain angle against a spring, not shown. After the raised part (6d) has passed over the arm (26a), the synchronizing lever (26) is restored to the initial position by the spring, accordingly, the synchronizing contact (23) and the pin (28) remain unaffected during the charging operation. When the flash system changeover lever (24) is set at the X-contact position as shown by the dashed lines, the arm (26a) of the synchronizing lever (26) is retracted from the passage of the raised part (6d) of the setting lever (6) while the arm (26b) of the synchronizing lever (26) engages with the raised part (12e) of the opening lever (12) and the synchronizing lever (26) is turned clockwise and consequently, the synchronizing contact (23) is turned clockwise and comes in contact with the pin (28).

Figure 12:
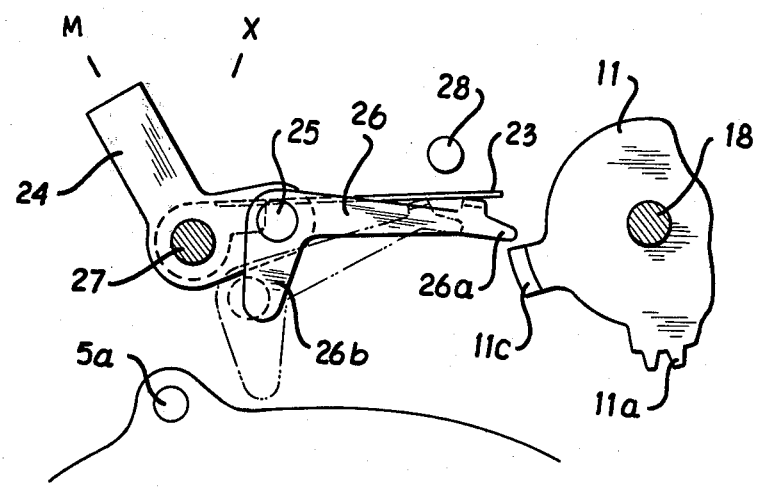

Referring to FIG. 12, explanation will be given of the manner of operation of another embodiment according to the present invention. The continuous lines and the dashed lines illustrate the position of the synchronizing lever (26) in the M-contact setting and the X-contact setting, respectively. When the shutter is released with the synchronizing lever (26) in the M-contact setting, the setting lever turns counterclockwise and the setting gear, engaged with the setting lever by the gear engagement, is turned clockwise (FIG. 1). Consequently, the raised part (11c) of the setting gear 11 pushes the arm (26a) of the synchronizing lever (26) oscillatably provided on the flash system changeover lever (24) by the shaft (25) so that the synchronizing lever (26) is turned counterclockwise pushing the synchronizing contact (23) against the pin (28). When the flash system changeover lever (24) is at the X-contact position as shown by dashed lines, the arm (26a) of the synchronizing lever (26) is retracted from the passage of the raised part (11c) of the setting gear while the other arm (26b) of the synchronizing lever (26) is shifted to a position where the arm (26b) is able to engage with the pin (5a) of the shutter blade control ring. Accordingly, in the exposure operation, the pin (5a) turns the synchronizing lever (26) counterclockwise at the same time when the shutter blades are started to open by the clockwise turning of the shutter blade control ring and the synchronizing contact (23) is turned to come into contact with the pin (28). In this case, the pin (5a) continues pushing the arm (26b) while the shutter blades remain opened because the pin (5a) is adapted not to pass over the arm (26b). The pin (5a) and the arm (26b) are disengaged when the shutter blades are closed by counterclockwise turning of the shutter blade control ring so that the contact between the synchronizing contact (23) and the pin (28) is disengaged.

It will be well understood from the description of the preferred embodiments according to the present invention that the present invention provides a flashing device comprising a simple mechanism composed of less component parts and of improved durability obtained by disposing the M-contact and the X-contact so as to be employed selectively. Furthermore, this invention is capable of setting the synchronizing mechanism at the neutral position where both the M-contact and the X-contact are idle, therefore, it is possible not to actuate the flash-light device even after the flash-light device has been charged or to set the synchronizing mechanism idle when the flash-light device is not used.

The M-contact and the X-contact are actuated by means of the setting gear and the timing lever, respectively, in the first embodiment; by means of the setting lever and the opening lever, respectively, in the second embodiment; and by means of the setting gear and the shutter blade control ring, respectively, in the third embodiment, however, it is to be understood that the combinations thereof may be changed or the M-contact setting position and the X-contact setting position may be interchanged without departing from the sprit and the scope of the invention as hereinafter claimed.

We claim:

1. A flash system changeover device for a shutter wherein the exposure operation is performed by cancelling the retention on a shutter blade control member in the charged state by the operation of an actuating member which has previously been charged and is actuated by a shutter release operation, the device comprising: a flash system switchover member, a switching member, a synchronizing switch, and means oscillatably mounting said switching member on the changeover member to close the synchronizing switch in connection with the operation of said actuating member when said flash system changeover member is set at a first position and also so as to close said synchronizing switch in connection with the shutter blade opening operation of said shutter blade control member when said flash system changeover member is set at a second position, and wherein the synchronizing switch has contacts having relative positions which are independent of the position of the changeover member when the synchronizing switch is in the open state.

2. A flash system changeover device as set forth in claim 1, wherein said flash system changeover member is capable of being set at a third position where said switching member is not engaged with either said actuating member or said shutter blade control member when the changeover member is in the third position.

3. In a camera having an actuating member movable in response to a shutter release operation prior to the start of exposure, and a shutter blade control member movable in conjunction with the opening of the shutter, the improvement comprising: a flash changeover device having a changeover lever movable between at least two positions corresponding to two synchronizing modes; a flash switch having a fixed contact, a movable contact and means mounting the movable contact for movement from a normal open position to a closed position independent of the synchronizing modes; and means coactive with the changeover lever for effecting movement of the movable contact to the closed position in response to the movement of the actuating member when the changeover lever is in a first position and in response to the movement of the shutter blade control member when the changeover lever is in a second position.

4. The camera according to claim 3; wherein the changeover lever is movable to three positions and wherein the means for effecting movement of the movable contact is disengaged from both the actuating member and the shutter blade control member when the changeover lever is in the third position.

5. The camera according to claim 3; wherein the means for effecting movement of the movable contact comprises a lever oscillatably mounted on the changeover lever.

* * * * *